United States Patent [19]

Mayhew, Jr.

[11] Patent Number: 4,587,989
[45] Date of Patent: May 13, 1986

[54] TURN DISC SLIDE VALVE

[76] Inventor: John D. Mayhew, Jr., 7511 Campbell Dr., Salem, Va. 24153

[21] Appl. No.: 703,371

[22] Filed: Feb. 20, 1985

[51] Int. Cl.$^4$ ............................................. F16L 7/00
[52] U.S. Cl. .................................... 137/375; 251/208; 251/302
[58] Field of Search ................. 251/302, 208; 137/375

[56] References Cited

U.S. PATENT DOCUMENTS

| | | | |
|---|---|---|---|
| 384,849 | 6/1888 | Hood | 251/327 |
| 903,354 | 11/1908 | Brown | 251/360 |
| 1,656,280 | 1/1928 | Lalor | 251/302 |
| 2,781,787 | 2/1957 | Johnson | 138/94.5 |
| 2,842,153 | 7/1958 | Volpin | 251/302 |
| 3,659,822 | 5/1972 | Nagy | 251/302 |
| 3,779,510 | 12/1973 | Krogsrud | 251/301 |
| 4,070,161 | 1/1978 | Harter | 48/210 |
| 4,161,307 | 7/1979 | Clinch et al. | 251/208 |
| 4,377,274 | 3/1983 | Mayhew, Jr. | 251/327 |
| 4,432,387 | 2/1984 | Sims | 251/302 |

FOREIGN PATENT DOCUMENTS 209147 12/1955 Australia ........................... 251/302

Primary Examiner—A. Michael Chambers
Attorney, Agent, or Firm—Griffin, Branigan & Butler

[57] ABSTRACT

A turn disc valve (10) includes a rigid, sealed, valve body having first and second, parallel, generally coextensive side-wall rigid plates (20 and 22) with a spacing wall (24) sealed between them to define a flat cavity therebetween. A relatively-resilient, high-density polyethylene, flat liner snugly fits inside said housing cavity and is made up of first and second substantially-flat side liner elements (32 and 34), each of a size and shape for substantially covering opposite interior side walls of the flat body cavity, and a spacer insert element (36) positioned between them. The liner defines a circular valve cavity, with the body side-wall plates and the side liner elements defining a fluid passage through the valve. A circular, flat, gate (16) is positioned snugly in the valve cavity but has freedom of rotation. The circular gate has a hole therethrough which, when the gate is rotated, can be brought into and out of registration with the fluid passage to respectively allow fluid to pass through the fluid passage and to block such flow. A drive means extends through the body and the liner to engage the gate for rotating it.

12 Claims, 5 Drawing Figures

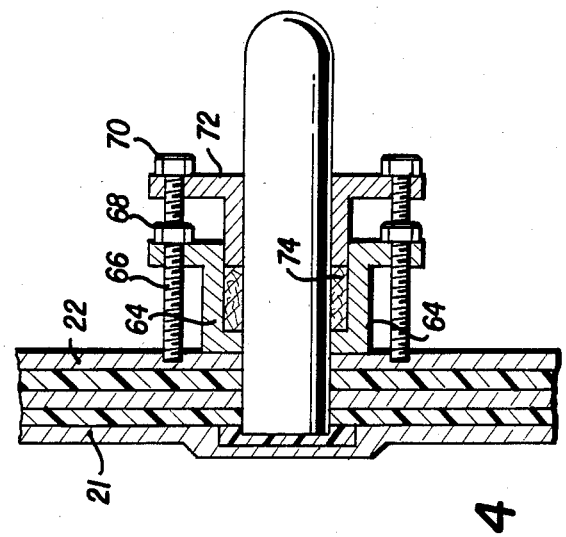
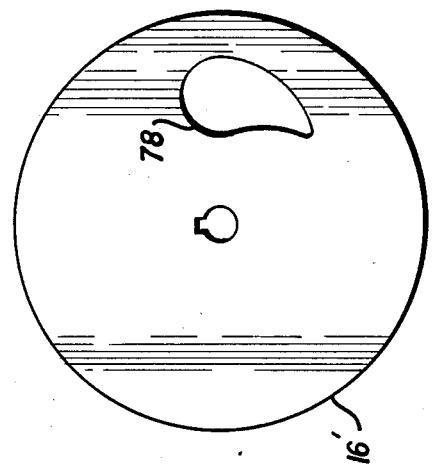
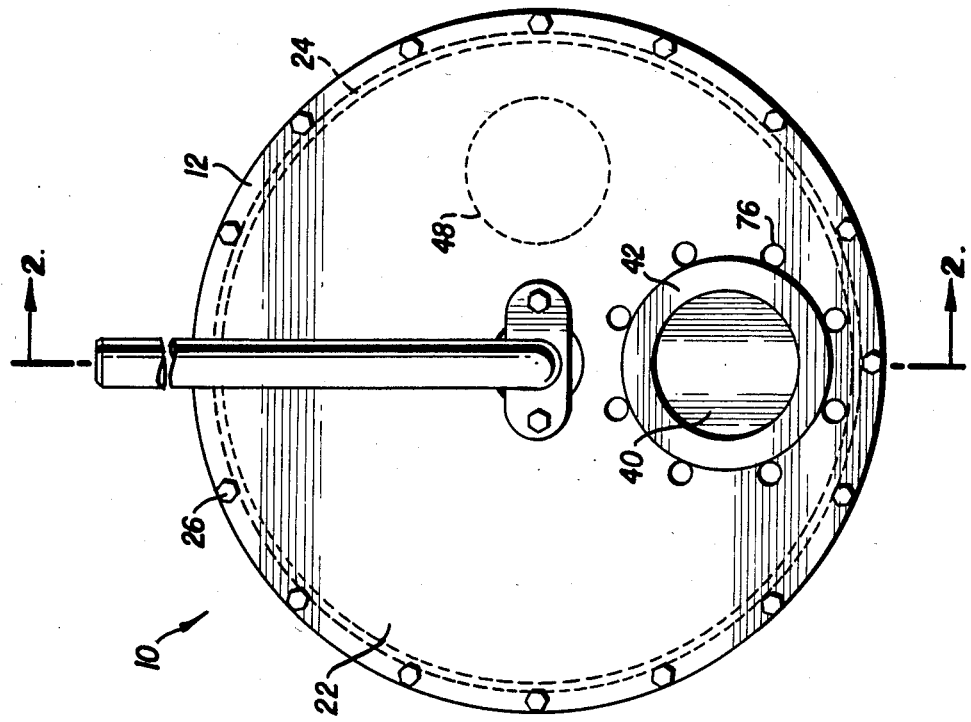
FIG. 4
FIG. 5
FIG. 1

TURN DISC SLIDE VALVE

BACKGROUND OF THE INVENTION

This invention relates broadly to the art of valves, and more specifically to valves which are normally used for controlling the flow of granular, dried, or slurry materials (materials having a relatively high percentage of solids).

Traditionally, valves used for controlling the flow of materials having a high percentage of solids (35 percent or above), such as coal, fly ash (wet or dry) have employed ball, butterfly, plug, or linear slide-gate valve elements. A special problem which exists when one attempts to gate solid materials is that when the valving element is moved into the flow path of the material it urges the material against an opposite wall and thereby tends to jam the valving element open or to foul, or clog, its seat. For this reason, valves normally used for high percentage solid materials usually involve solid movable members with openings therethrough which are simply slid behind seals, out of the flow paths, to close the valves, rather than being pushed against a valve seat. Flow material which is in the opening of the valving element during a closing movement simply stays in the opening and is again picked up by material flow when the valve is again opened.

A very popular valve for valving high-percentage solid materials is a slide gate valve, one of which is described in U.S. Pat. No. 4,070,161 to Harter in which a reciprocally moving slide member is linearly moved to either the right or left by a rod to bring a hole therein into and out of registry with material flow. A significant problem with such valves is that they are quite long and take up a great deal of lateral space. Further, the slide members of such valves usually have seals and scrapers mounted thereon requiring a high degree of precision in construction and are, therefore, rather complicated to construct. Also, such valves require empty spaces in sealed housings which can become clogged with the flowing materials and which, therefore, can, and sometimes do, clog the valves. Thus, it is an object of this invention to provide a valve for controlling the flow of materials having high percentages of solids which takes up very little space, which has a relatively uncomplicated valving element not requiring special seals and scrapers, and which is virtually uncloggable.

Rotary valves are known in which rotary valving elements have holes therein for rotating into and out of registratry with flow paths. Several examples of these are described in U.S. Pat. No. 2,781,787 to Johnson; U.S. Pat. No. 3,779,510 to Krogsrud; U.S. Pat. No. 903,354 to Brown; and, U.S. Pat. No. 384,849 to Hood. Krogsrud (U.S. Pat. No. 3,779,510) is particularly relevant with regard to this invention inasmuch as it discloses a rotary valving element which is held in a gastight housing. However, most of these valves, including Krogsrud have complicated rotary valving elements which include such things as scrapers thereon to help clean seals. In this respect, most prior-art rotary valves, including those mentioned above, do not have easy-to-manufacture sealing arrangements between their valving elements and their housings or bodies. Thus, it is an object of this invention to provide a rotary slide valve which, in addition to providing the above benefits, has an effective sealing arrangement between a sealed body (housing) and a valving element which is uncomplicated to construct and assemble, constructed of inexpensive parts, is extremely effective in allowing easy rotation of the valving member, provides a seal with the valving member in either of opposite directions, and virtually makes impossible the clogging of the valve.

It is noted that the valve described in Johnson (U.S. Pat. No. 2,781,787) does not have a sealed housing and would therefore allow an unacceptable amount of leakage for some applications. It is an object of this invention to provide a turn disc slide valve which employs a sealed housing.

SUMMARY OF THE INVENTION

According to principles of this invention, a turn disc valve has a rigid sealed body or housing which defines a flat body cavity in which a relatively-resilient valve liner snugly fits. The valve liner includes first and second substantially flat side liner elements separated by a spacer insert element, all of these elements defining a circular valve cavity. A flow hole communicating with the circular valve cavity extends laterally through the body and the side liner elements for forming a fluid passage through the valve. A circular, flat, gate is positioned snugly in the valve cavity but has freedom of rotation therein. The circular, flat gate has a hole therethrough which, when the gate is rotated, can be brought into and out of registration with the flow hole to respectively allow fluid to pass through the flow hole and to block the flow. A driving device extends through the body and the liner to rotate the circular gate. The liner elements are sized such that they substantially fill the body cavity with the exception of the valve cavity, which is filled by the gate.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a side view of a turn disc slide valve of this invention;

FIG. 4 is a fragmented sectional view taken on line 4—4 in FIG. 2; and

FIG. 5 is a side view of an alternate embodiment valving gate used with the valve of FIG. 1.

DESCRIPTION OF THE PREFERRED EMBODIMENT

Figure 2:
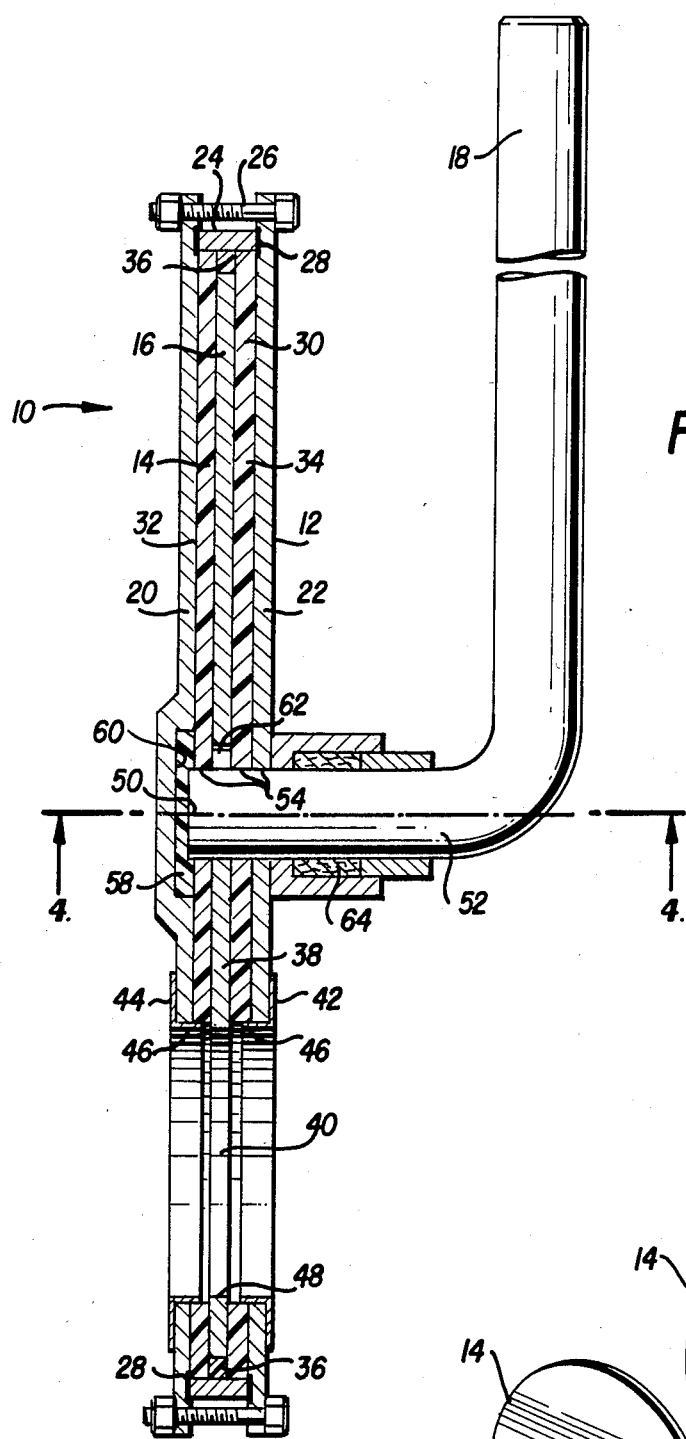
FIG. 2 is an end, partially in section, view of the turn disc slide valve of FIG. 1.

Referring now to FIGS. 1-4, a ¼ turn disc slide valve 10 basically comprises a sealed outer body, or housing, 12, a liner 14, a valving gate 16, and a driving or actuating stem 18. The sealed body or housing 12 comprises first and second generally coextensive side-wall rigid plates 20 and 22 respectively and a hoop-shaped spacing wall 24 clamped between them by bolts 26 located outside the periphery of the hoop-shaped spacing wall 24. Gaskets 28 are positioned between the edges of spacing wall 24 and the first and second rigid plates 20 and 22 so that these members form a flat, sealed, body cavity 30 therein.

The liner 14 is positioned inside the body cavity 30 and is comprised of first and second side liner elements 32 and 34 respectively and a spacer insert element 36. The arrangement of these elements provides a circular valve cavity 38 in which the round, disc-shaped valve gate 16 is mounted.

The body 12, including the first and second rigid plates 20 and 22 and the spacing wall 24 are constructed of forged steel or cast iron and, in the preferred embodiment, the first and second rigid plates 20 and 22 are round and slightly larger than the spacing wall 24 in order to accommodate the bolts 26. The hoop-shaped spacing wall 24, in the illustrated embodiment, is also circular in shape.

The liner 14, including the first and second side liner elements 32 and 34 and the spacer insert element 36 is, in the preferred embodiment, constructed of polyethlyene thermoplastic having a molecular weight of two to six million. A particular product which works well for the liner is a high-density polyethlyene sold under the trademark 1900 UHMW Polymer by Hercules, Incorporated of Wilmington, Del. The disc-shaped first and second liner elements 32 and 34 and the spacer insert element 36 all have an outer diameter which is substantially the same as the inner diameter of the body spacing wall 24 and their combined thicknesses are such that there is virtually no cavity left between the liner 14 and the body 12. In this respect, to even insure to a greater extent that there are no cavities the outer surfaces of the liner elements are sprayed by a liquid silicon immediately prior to assembly which sets up after assembly. Currently, a silicone liquid manufactured by General Electric under the designation RTV108 is employed.

Figure 3:
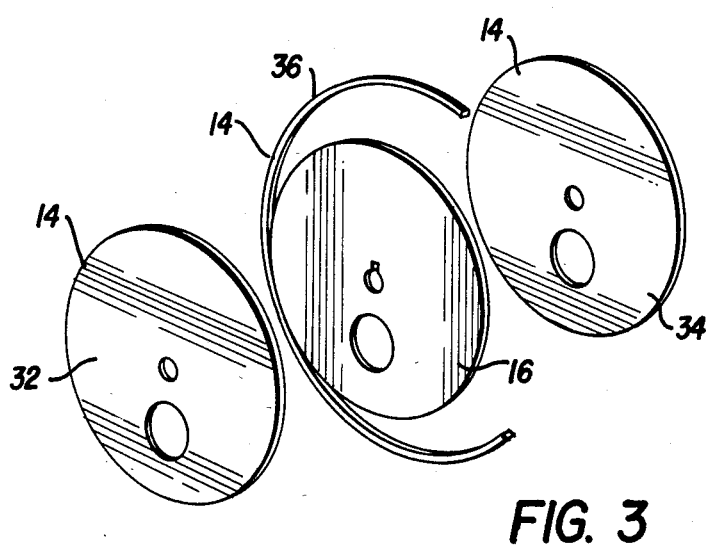
FIG. 3 is an exploded view of the liner and valving gate of the valve of FIG. 1.

In the preferred embodiment, the spacer insert element 36 is cut from a sheet of high density polyethylene as a straight member and is then bent to form a circle, as is shown in FIG. 3, to completely encircle the valve cavity 38.

The first and second rigid plates 20 and 22 of the body and the first and second side liner elements 32 and 34 all have holes therein which, when these elements are assembled, form a flow hole 40. Welded to the outer surfaces of the first and second rigid plates 20 and 22 at the flow hole 40, are retaining rings 42 and 44 which are L-shaped in section, each having a leg 46 extending into the flow hole 40 toward the interior of the valve beyond the first and second side liner elements 32, but not reaching the plane of the valve cavity 38. These retaining rings 42 and 44 not only provide smooth flanges for making contact with mating pipe and protection at the mouth of the flow hole 40, but also lock the first and second side liner elements 32 and 34 in position within the body cavity 30. These flanges can be constructed of various materials, however, in the preferred embodiment they are constructed of stainless steel.

The circular disc gate 16 is mounted in the valve cavity 38. The gate 16 is constructed of stainless steel and has an valve opening 48 therein which, by rotating the gate 16 can be brought into registration with the flow hole 40. Again, the gate 16 is of a size to closely fit within the valve cavity 38, however, the high-density polyethylene liner provides a slick surface within the valve cavity for the valve gate 16 to relatively easily rotate about an axis 50.

Positioned at the axis 50 is a driving member 52 of the actuating stem 18 which extends through aligned holes 54 in the second rigid plate 22, the first and second side liner elements 32 and 34, and the valve gate 16. The driving member 52 is circular in cross-section and is seated in a cup 58 formed of the same high-density polyethylene material of which the liner 14 is made. The cup 58 is in a recess 60 formed on the inner surface of the first rigid plate 20. The driving member 52 of the stem 18 causes the gate 16 to rotate by means of a key 62 which locks these two members together, however, the driving member 52 is otherwise free to rotate in the cup 58 and the holes 54 of the second rigid plate and the first and second side liner elements. The driving member 52 is surrounded by a packing cup member 64 which is screwed to the second rigid plate 22 by means of special bolts 66. Nuts 68 on these bolts hold the packing cup member 64 sealed with a gasket against the second rigid plate 22 whereas heads 70 hold a packing follower 72 against packing 74 in the cup member 64.

For purposes of simplification, mounts for the valve body are not shown. It will be understood that pipe flange threaded holes 76 surround the passage 40 to allow the valve 10 to be attached to pipes through which flow is to be controlled.

In operation, the valve of this invention is constructed by first mounting the driving member 52 of the stem 18 in the second rigid plate 22 with the packing cup member 64 and its respective bolts, packing and packing follower. Now the second side liner element 34 and the valve gate 16, with its key 62, can be put in place followed by the first side liner element 32. The spacer insert element 36 is then wrapped around the gate 16 in the space left between the first and second side liner elements 32 and 34 and the spacing wall 24 is slid over the outer periphery of the liner 14 to hold the spacer insert element 36 in its circular configuration. Of course it is understood that gaskets 28 are included between the spacing wall 24 and the first and second rigid plates 20 and 22. Next, the bearing cup 58 is placed over the end of the driving member 52 and the first rigid plate 20 is then screwed to the second rigid plate 22 by means of the bolts 26. The retaining rings 42 and 44 are welded to the outer surfaces of the first and second rigid plates 20 and 22 prior to their being assembled as described above.

In order to use the valve, it is screwed onto a pipe line by bolting flanges of pipes onto the retaining rings 42 and 44 by means of threaded holes 76. By rotating the actuating stem 18 through ¼ of a turn the valve opening 48 can be brought into and out of registry with the flow hole 40 to thereby open and close the valve.

FIG. 5 depicts an alternate embodiment of the gate 16' in which a tapered, throttle, hole 78, is used to more gradually reduce flow then is possible with a round hole.

It will be understood by those skilled in the art that the quarter turn disc slide valve of this invention uses relatively little space, its motion being circular, rather than linear. Also, it will be understood that since there are virtually no spaces left in the body cavity 30 in which slurry, solids and the like can harden or become wedged there is very little chance of the valve jamming. Further, since the valve is in a sealed housing it has very little leakage. The valve is easy to construct since liner elements do not have to be molded, or built onto seats, but rather are simply constructed of strips which are put into place before the valve is closed. The valve gate and liner parts do not have to be constructed to a high degree of accuracy because the resiliency of the liner and the silicone with which it is sprayed automatically corrects for inaccuracies.

One tremendous benefit of the above-described valve is that it conforms to the standardized face-to-face dimension for knife gate valves so that it can actually be used to replace a knife gate valve. Many rotary valves, and slide valves, are too thick to replace knife gate valves. Also, it can be used to control flow in either direction without making any special provisions for seats on one side or the other. All in all, this valve provides an exceptional advancement of the art in that it is easy and inexpensive to construct, reliable in use and provides operational benefits which are not available in almost any other similar valve.

While the invention has been particularly shown and described with reference to a preferred embodiment, it will be understood by those skilled in the art that various changes in form and detail may be made therein without departing from the spirit and scope of the invention. For example, it is not necessary that the body 12 be circular in shape so long as the liner elements virtually completely fill the space between the gate and the body and form a valve cavity which is circular. One benefit in having a circular housing is that the spacer insert element 36 can be cut straight and bent into a circular shape which does not produce as much waste high-density polyethylene as when this element must be cut to be round, which would be the case if the housing were square for example. Further, the gate could be driven in other manners than that described above.

The embodiments of the invention in which an exclusive property or privilege is claimed are defined as follows:

1. A turn disc valve comprising:
   a generally rigid, sealed, valve body having first and second generally coextensive side-wall rigid plates sealed with a spacing wall extending between said two rigid plates for spacing said rigid plates a fixed distance one from the other, so that said spacing wall and said plates define a flat body cavity therebetween, said two rigid plates having aligned body flow holes extending laterally therethrough for forming a fluid passage through said valve body;
   a relatively-resilient valve liner means of a size and shape for snugly fitting in said flat cavity, said relatively-resilient valve liner means comprising first and second substantially flat side liner elements each of a size and shape for substantially covering opposite interior side walls of said flat cavity in said body and a spacer insert element positioned between said two side liner elements having a substantially circular radial interior surface for defining, with said flat side liner elements, a flat circular valve cavity and both said side liner elements defining liner flow holes spaced radially inwardly from said radial interior surface of said spacer insert element, said holes extending laterally therethrough communicating with said flat circular valve cavity for forming a fluid passage coinciding with the fluid passge of said body when said liner means is mounted in said body cavity;
   a circular, flat, gate positioned snugly in said valve cavity whose outer diameter is substantially surrounded by the radial interior surface of said spacer insert element but having freedom of rotation therein, said circular gate having a hole therethrough spaced radially inwardly from said outer diameter which, when said gate is rotated about an axis, can be brought into and out of registration with said body flow holes and said lining flow holes to respectively allow fluid to pass through said fluid passage and to block said fluid from passing therethrough; and
   a drive means extending through said body and said liner for engaging said circular flat gate therein and rotating it from outside said body.

2. A turn disc valve as in claim 1 wherein said drive means extends through said body and said liner at the axis of rotation of said circular, flat, gate.

3. A turn disc valve as in claim 1 wherein said liner spacer insert element is a separate element which is formed of a straight member which is bent into a circular shape for forming said circular valve cavity.

4. A turn disc valve as claimed in claim 1 wherein said liner is constructed of three pieces of high-density polyethylene.

5. A turn disc valve as in claim 4 wherein said liner spacer insert element is formed of a straight member which is bent into a circular shape for forming said circular valve cavity.

6. A turn disc valve as in claim 1 wherein said body spacing wall of said body is round in shape and is a separate piece from at least one of said first and second side-wall plates.

7. A turn disc valve as in claim 6 wherein said liner spacer insert has a round outer dimension when it is mounted in said valve.

8. A turn disc valve as in claim 7 wherein said liner spacer insert is cut straight but is bent into its round shape.

9. A turn disc valve as in claim 8 wherein the liner elements are constructed of a high density polyethylene.

10. A turn disc valve as in claim 1 wherein said hole in said gate is not round but tapered on one side so that rotation of said disc will produce a more gradual throttling effect in controlling fluid flow.

11. A turn disc valve as in claim 1 wherein all liner parts are constructed by a method including the step of spraying preformed members with a hardening resinous substance immediately prior to their assembly with each other and the valve body and then allowing the hardening resinous substance to harden on the liner parts after assembly.

12. A turn disc valve as in claim 1 wherein said gate hole is round at one end and tapered at the other.

* * * * *